Figure 1:
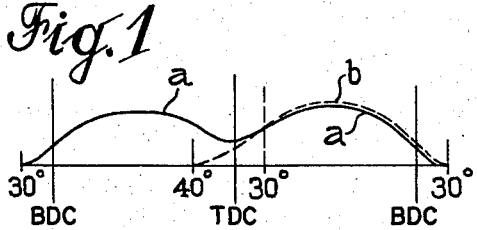

United States Patent Office 2,958,316
Patented Nov. 1, 1960

2,958,316

VALVE ACTUATING GEAR FOR FOUR-STROKE INTERNAL COMBUSTION ENGINES

Alfred Buchi, Hurden, Switzerland
(Archstrasse 2, Winterthur, Switzerland)

Filed May 12, 1958, Ser. No. 734,665

Claims priority, application Switzerland June 19, 1957

7 Claims. (Cl. 123—79)

The invention relates to an actuating gear for the valves of four-stroke internal combustion engines comprising concentric inlet and exhaust valves moving one inside the other.

According to the present invention, the valve gear means for the inlet valve and exhaust valve is so arranged that the exhaust valve closes on the open inlet valve when the pair of valves are moving in the same direction at substantially the same speed. This ensures that the exhaust valve is applied gently to the open inlet valve, a feature greatly helping to reduce the forces which the valve gear means of the inlet valve is required to transmit. The valve gear means for the inlet and exhaust valves can be so arranged that the closure of the exhaust valve on the open inlet valve is effected only when the latter (inlet valve) is moving at a relatively reduced speed. This step helps further to reduce the forces which the valve gear means of the inlet valve are required to transmit.

According to another feature of the invention, the valve gear means for the inlet and exhaust valves is so designed, and its control cams so offset from one another in the direction of engine rotation, that the exhaust valve closes on the inlet valve only when the same has at least substantially reached maximum stroke. The forces which the valve gear of the inlet valve are required to transmit upon closure of the exhaust valve are therefore further reduced and little, if any torsion is applied to the inlet valve cam upon closure of the exhaust valve. The valve gear means can also be arranged so that the maximum stroke of the exhaust valve, which has a smaller valve diameter than the inlet valve, is equal to or lesser or greater than the maximum stroke of the inlet valve, before closure of the exhaust valve on the inlet valve. Hence, more particularly in the second two alternatives referred to, the area of the discharge opening of the exhaust valve can be relatively large, while the flatter design of the exhaust valve cam helps the exhaust valve to engage more gently with the inlet valve.

The valve gear means can be so arranged that the exhaust valve has, at least during the scavenging period, a greater total stroke than the inlet valve. As a result, an increased amount of scavenging air can be delivered from the engine, at least during the scavenging period, because of the reduced constricting resistances. Also, the valve gear means may be so designed that, following closure of the exhaust valve on the inlet valve, the exhaust valve is kept closed on the inlet valve by the valve gear springs until the next exhaust period.

Figure 5:
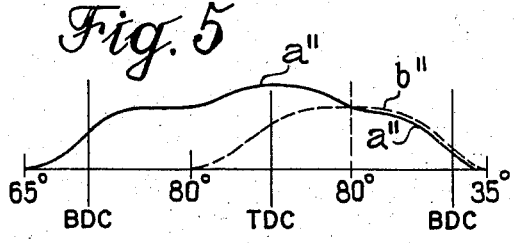
Figure 6:
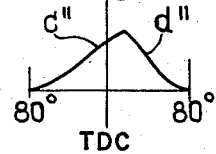
Figure 7:
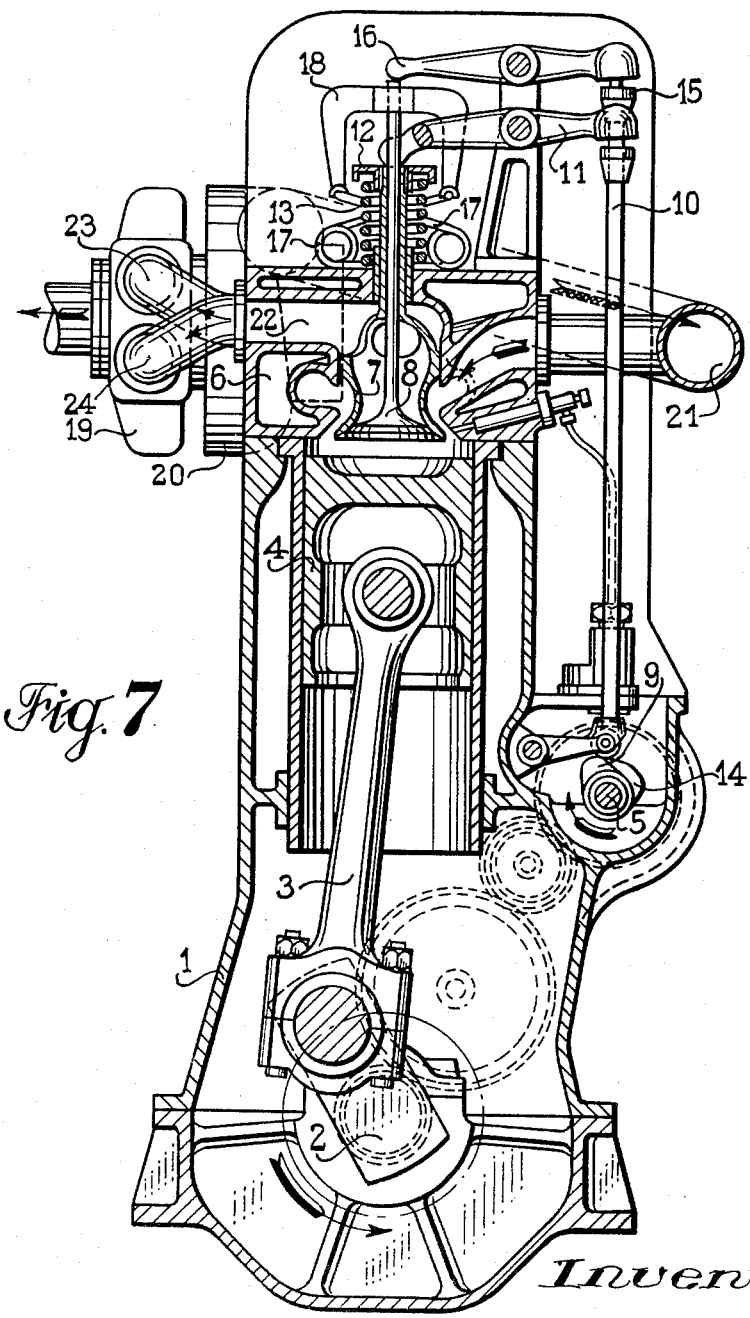
Figure 8:
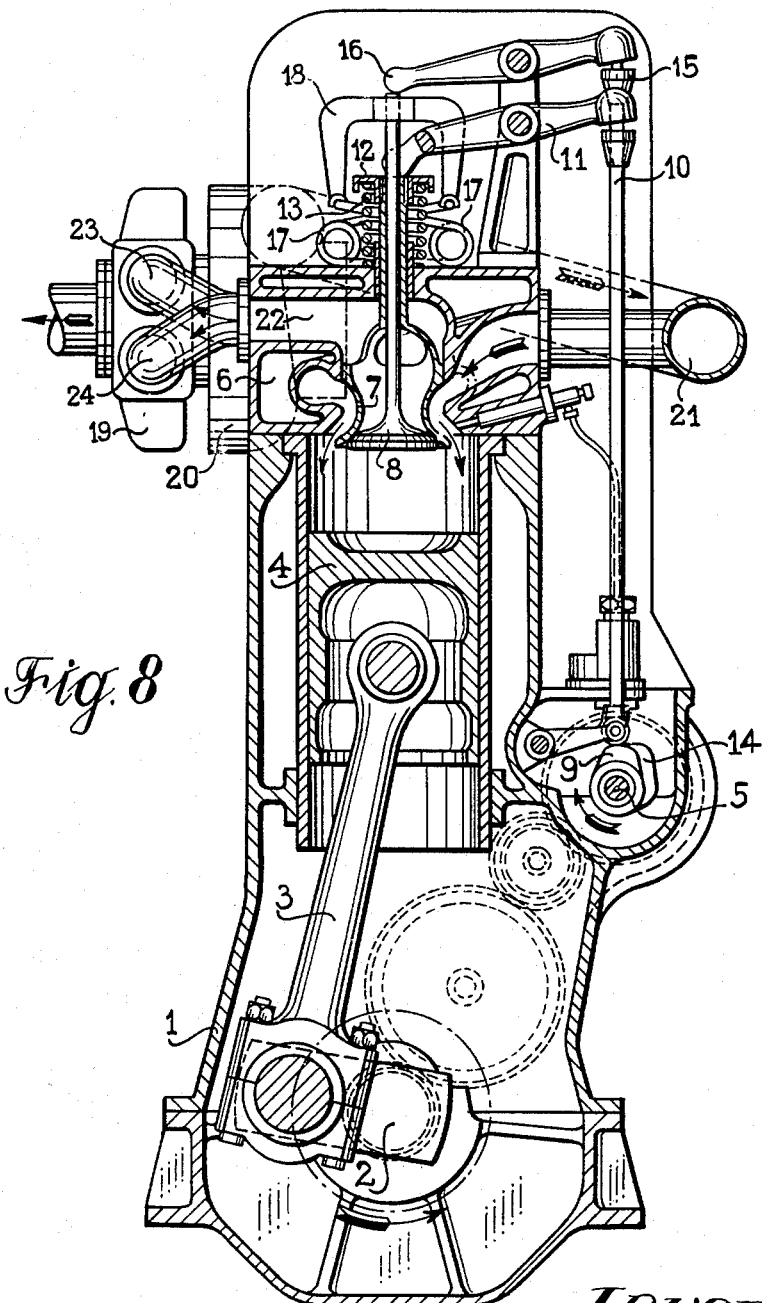

Practical applications of the invention will now be described, by way of example only, with reference to the accompanying drawings whereof:

Figs. 1 to 6 are valve gear diagrams showing the operation of the valve gear of internal combustion engines according to the invention, and Figs. 7 and 8 are sectional elevations of a four-stroke internal combustion engine incorporating valve gear according to the present invention.

Corresponding control steps are indicated in Figs. 1 to 6 by identical letters, while like parts in the construction shown in Figs. 7 and 8 have the same reference numbers.

Figure 3:
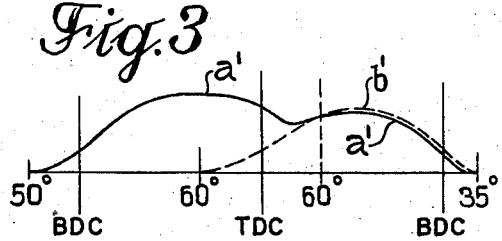

Figs. 1, 3 and 5 illustrate valve-lift curves of the inlet and exhaust valves of the internal combustion engines for different angles of their crankshafts. By way of example, different control times for the inlet and exhaust valves have been assumed.

Figure 2:
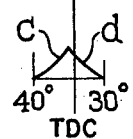
Figure 4:
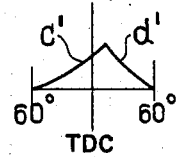

Figs. 2, 4 and 6 which correspond to the diagrams shown in Figs. 1, 3 and 5, illustrate how the area of the gas flow opening provided between the inlet and exhaust valves for the scavenging air entering the cylinders varies during the scavenging periods in the cylinders; Figs. 2, 4 and 6 are also related to the crank angles of the engines concerned.

Figs. 7 and 8 each show vertical sectional views through one cylinder of an internal combustion engine according to the invention and incorporating valve gear means providing the operating conditions for the inlet and exhaust valves during the scavenging periods which are shown in Figs. 1 and 2 and 5 and 6.

Referring to Fig. 1, $a$ (solid line) represents the valve-lift curve of the exhaust valve. According to this curve, the exhaust valve of each cylinder opens 30° before bottom dead centre (BDC) and has its maximum opening approximately in the middle of the exhaust stroke between BDC and top dead centre (TDC) of the pistons, whereafter the opening is reduced. According to the invention, the closure of the exhaust valve on the opened inlet valve in accordance with valve lift curve $b$ (chain line) is effected only when the strokes of the two valves have been corrected to one another so that the pair of valves are moving in the same direction at substantially the same speed at 30° after TDC in the case of Fig. 1. To this end, in Fig. 1 the stroke of the exhaust valve increases towards the position of closure of the exhaust valve on the inlet valve. Such control of the stroke of the two valves ensures that the exhaust valve engages gently with the still open inlet valve, thus preventing the valve gear from having excessive forces applied to them. When the exhaust valve has closed on the still open inlet valve, the control cam for the exhaust valve is further designed so that the exhaust valve is kept closed by the exhaust valve spring during the remainder of the stroke of the inlet valve i.e., the valve lift curve $a$ of the exhaust cam remains constantly lower than the inlet valve lift curve $b$ until after the inlet valve has closed, such closure occuring in Fig. 1, for instance, 30° after BDC.

As shown in Fig. 1, the maximum stroke $a$ of the exhaust valve is advantageously less than the maximum stroke $b$ of the inlet valve. Because the exhaust valve has a smaller opening diameter than the inlet valve such provision provides for a closure pressure of the outlet valve upon the inlet valve.

Fig. 2 illustrates the area of the gas flow opening $c$ of the inlet valve and $d$ of the exhaust valve during the scavenging period which, as can be seen in Fig. 1, lasts from 40° before TDC to 30° after TDC. The variation or area of the gas flow opening between the inlet and exhaust valve is due to the changes represented by curves $c$, $d$. Curve $c$ is produced by the inlet valve movement from 40° before TDC to before TDC and thereafter, in accordance with curve $d$, by the exhaust valve as it closes on the inlet valve. As already stated, the exhaust valve remains closed on the inlet valve until 30° after TDC. The valve gear and control cam thereof are also so designed that, after the exhaust valve has seated and closed on the inlet valve, the exhaust valve is kept closed by the exhaust valve spring during the following inlet, compression, combustion and expansion phases in the cylinder until it opens again 30° before BDC.

Fig. 3 illustrates, in a manner similar to Fig. 1, the valve-lift curves of the exhaust and inlet valves of an internal combustion engine according to the invention, the valves having different control times from those shown in Fig. 1. The solid line $a'$ is the exhaust-valve lift curve and the chain line $b'$ is the inlet valve lift curve. The exhaust valve opens 50° before BDC and closes at 60° after TDC on the already opened inlet valve. In this case, however, the maximum exhaust valve stroke is greater than that of the inlet valve. Before the exhaust valve closes on the inlet valve, the exhaust valve stroke again decreases, to increase again towards the instant when the exhaust valve closes on the inlet valve. The lift-curves of the strokes $a'$ and $b'$ of the two valves approach one another substantially asymptotically when the exhaust valve closes on the inlet valve 60° after TDC. Also, the inlet valve lift curve $b'$ rises gradually at the instant when the exhaust valve closes on the inlet valve, so that the exhaust valve closes gradually on the slowly opening inlet valve, with the result that the forces to open the valve are thereby reduced, more particularly the forces of the valve gear of the inlet valve. After the exhaust valve has closed on the inlet valve, the exhaust-valve lift curve $a'$ is lower than the inlet valve lift curve $b'$ to ensure that the exhaust valve is kept closed (by the exhaust valve spring) on the inlet valve until the exhaust valve opens again after the inlet, compression, combustion and expansion phases.

Fig. 4 illustrates, again in dependence upon the crank angle, the variation in area of the gas-flow openings of the inlet and exhaust valves during the scavenging period, which extends from 60° before TDC to 60° after TDC. The reference $c'$ denotes the area of the opening which is governed by the inlet valve and which is open until after TDC. The reference $d'$ is the opening which exists during the scavenging period and which is governed by the exhaust valve.

Fig. 5 illustrates the exhaust-valve lift curve $a''$ (solid line) and the inlet valve lift curve $b''$ (chain lines) when the exhaust valve opens 65° before BDC and closes 80° after TDC, the inlet valve opening 80° before TDC, and closing 35° after BDC. The exhaust-valve lift curve $c''$ extends substantially asymptotically in the region where it closes on the inlet valve lift curve $b'$. However, the exhaust valve closes on the inlet valve only when the inlet valve has reached its maximum stroke and is therefore not moving. The absolute speed at which the exhaust valve impinges on the inlet valve is therefore lower than with the operation illustrated in Figs. 1 and 3. After the exhaust valve has closed on the inlet valve, the valve gear and control cam thereof for the exhaust valve is so designed that the exhaust valve is kept closed on the inlet valve by the exhaust valve springs alone during the following inlet, compression, combustion and expansion phases until the beginning of the next exhaust period.

In the example illustrated in Fig. 5, the exhaust valve lift curve $a''$ is more irregular than the corresponding curve in Figs. 1 and 3. The exhaust valve is initially only partly opened, whereafter its opening is increased beyond the stroke $b''$ of the inlet valve during the scavenging phase. Since the stroke $a''$ of the exhaust valve extends beyond the inlet strokes $b''$, the exhaust valve can be closed very gradually on the inlet valve so that the forces are produced by closing the exhaust valve—and which would be applied to the inlet valve gear—are of no consequence.

Another advantage of the exhaust-valve lift curve $a''$ showed in Fig. 5 is that the valve cams need not be provided with recesses as was proposed, in Figs. 1 and 3, for the exhaust valve near the closure point. Of course, the size and pattern of the inlet and exhaust valve strokes can be chosen as required, the emphasis being on providing permissible compression and acceleration forces on the parts of the valve gear by appropriate design of the valve gear according to the invention.

In Fig. 6, just as in Figs. 2 and 4, the area of the valve inlet opening is shown during the scavenging period but from 80° before TDC to 80° after TDC. The reference $c''$ shows the change in the area of the opening of the inlet valve and the reference $d''$ denotes the change in the area of the opening between the exhaust valve and the inlet valve. Depending upon whether the scavenging periods start as shown in Figs. 2, 4 or 6, the minimum area of the scavenging opening can be controlled by the valves. Of course, the pattern of the scavenging area $c$, $d$ and $c'$, $d'$ and $c''$, $d''$ can be varied by the special design of the lift curves $a$, $b$ and $a'$, $b'$ and $a''$, $b''$ respectively, and its maximum can be shifted to a different position of the engine crankshaft.

Referring to Fig. 7, the reference 1 denotes a cylinder block, 1' a cylinder liner, 2 a crankshaft, 3 a connecting rod, 4 a piston and 6 a cylinder head. The inlet valve 7 and the exhaust valve 8, which is concentric to the inlet valve 7 and moves therein, are disposed in the cylinder head 6. The inlet valve 7 is opened by the inlet valve-gear cam 9 which is secured to a camshaft 5 and which operates the valve 7 by way of a push rod 10, rocker arm 11 and valve spring retainer 12. The valve is closed at a suitable time by a spiral spring 13. The exhaust valve is opened by the cam 14, which is fitted to the camshaft 5, push rod 15 and rocker arm 16, and is closed on the inlet valve 7 by a double hairpin spring 17 and fork lever 18. The control means of this engine are designed as shown in Figs. 1 and 2. The elements 2, 3, 4 are shown in a position in which the crank 2 is at 30° after TDC in accordance with Fig. 1. The inlet valve 7 has already opened and the exhaust valve is closed on the inlet valve. This is the time when because of the special design of the control device and of the exhaust and inlet control cams, the exhaust valve is applied relatively gently to the inlet valve.

An exhaust gas turbo-supercharger comprising an exhaust gas turbine 19 and its blower 20 is connected to the engine. The charging air is supplied to the engine through a conduit 21. The engine exhaust gases flow through conduits 22, 23, 24 to the exhaust gas turbine 19. Of course, the engine, need not have any supercharger or it can be provided with any other charging device such as, for instance, a charging device driven by the engine itself or by other means.

Fig. 8 is a similar view to Fig. 7 and is a vertical sectional view though one cylinder of an engine according to the invention. However, the illustration relates to a control device designed in accordance with the valve lift curves illustrated in Fig. 5. The inlet valve 7 is at its maximum stroke when the exhaust valve 8 closes on it. The exhaust valve cam 14 opens the exhaust valve only partly before the opening of the inlet valve 7 but opens the exhaust valve 9 more rapidly during the scavenging period. The lift of the exhaust cam 14 is therefore greater during the scavenging period for the exhaust valve than the lift applied by the inlet valve cam 9 to the inlet valve 7. Hence, a very large scavenging area can be provided between the inlet and exhaust valves as shown in Fig. 6.

It is unnecessary to illustrate a control device and inlet and exhaust valves of the kind corresponding to Figs. 3 and 4, where the exhaust valve cam has a greater lift over a greater angular distance than it is in the design illustrated in Fig. 5.

What I claim is:

1. In a four-stroke internal combustion engine having a cylinder head, an inlet valve seated in the cylinder head, an exhaust valve arranged concentrically within the inlet valve and with the opening periods of such valves being overlapping, spring means urging said valves to a seated position, and means controlling the opening of said valves, the controlling means including a cam shaft, inlet valve and outlet valve cams on the cam shaft, means operably connecting the cams to the respective valves for opening the same against the action of the spring means associated therewith, and the respective cam peripheries being so formed and so arranged on the cam shaft relative to each other that the closing of the exhaust valve on the open inlet valve occurs when the valve-lift curves of both valves are equated substantially asymptotically respecting one another.

2. The controlling means as claimed in claim 1, in which said cam peripheries are so formed and so arranged on the cam shaft relative to each other that the closing of the exhaust valve on the open inlet valve occurs only when the movement of the inlet valve reaches a relatively slow speed.

3. The controlling means as claimed in claim 1, in which said cam peripheries are so formed and so arranged on the cam shaft relative to each other that the closing of the exhaust valve on said open inlet valve occurs only when the inlet valve has reached approximately its maximum stroke.

4. The controlling means as claimed in claim 1, in which said cam peripheries are so formed and so arranged on the cam shaft relative to each other that the stroke of the exhaust valve prior to closing is greater than the stroke of the inlet valve while following closing of the exhaust valve, the height of the stroke of the exhaust cam is less than that of the inlet cam.

5. The controlling means as claimed in claim 1, in which said cam peripheries are so formed and so arranged on the cam shaft relative to each other that at least temporarily the exhaust valve has a greater stroke than the maximum stroke of the inlet valve.

6. The controlling means as claimed in claim 1, in which said cam peripheries are so formed and so arranged on the cam shaft relative to each other that at least during the scavenging period, the exhaust valve has a greater stroke than the maximum stroke of the inlet valve.

7. The controlling means as claimed in claim 1, in which said spring means is so formed and arranged that following closing of the exhaust valve on the inlet valve, the exhaust valve remains closed until the next exhaust period under the action of its spring means.

References Cited in the file of this patent
UNITED STATES PATENTS
2,213,202     Buchi _____ Sept. 3, 1940